US008467370B2

(12) United States Patent
van Greunen et al.

(10) Patent No.: US 8,467,370 B2
(45) Date of Patent: Jun. 18, 2013

(54) BEACONING TECHNIQUES IN FREQUENCY HOPPING SPREAD SPECTRUM (FHSS) WIRELESS MESH NETWORKS

(75) Inventors: Jana van Greunen, Redwood City, CA (US); Sterling Hughes, Oakland, CA (US); William E. San Filippo, III, Los Altos Hills, CA (US); Raj Vaswani, Portola Valley, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 924 days.

(21) Appl. No.: 12/192,677

(22) Filed: Aug. 15, 2008

(65) Prior Publication Data
US 2010/0040042 A1 Feb. 18, 2010

(51) Int. Cl.
*H04J 3/16* (2006.01)
(52) U.S. Cl.
USPC .......................................... 370/346; 370/350
(58) Field of Classification Search
None
See application file for complete search history.

(56) References Cited

U.S. PATENT DOCUMENTS

| | | | | |
|---|---|---|---|---|
| 7,474,686 B2 * | 1/2009 | Ho | | 375/132 |
| 2003/0063655 A1 * | 4/2003 | Young | | 375/132 |
| 2003/0117966 A1 * | 6/2003 | Chen | | 370/255 |
| 2004/0095880 A1 * | 5/2004 | Laroia et al. | | 370/208 |
| 2004/0106408 A1 | 6/2004 | Beasley et al. | | |
| 2004/0253954 A1 * | 12/2004 | Lee et al. | | 455/436 |
| 2005/0047383 A1 * | 3/2005 | Yoshida | | 370/338 |
| 2005/0271006 A1 * | 12/2005 | Chari et al. | | 370/329 |
| 2006/0109815 A1 * | 5/2006 | Ozer et al. | | 370/329 |
| 2007/0223451 A1 * | 9/2007 | Ren et al. | | 370/352 |
| 2007/0258508 A1 * | 11/2007 | Werb et al. | | 375/140 |
| 2008/0107157 A1 | 5/2008 | De Ruijter | | |
| 2008/0192629 A1 * | 8/2008 | Chari | | 370/230 |
| 2008/0240112 A1 * | 10/2008 | Muqattash et al. | | 370/395.31 |

FOREIGN PATENT DOCUMENTS

| | | |
|---|---|---|
| GB | 2375014 A | 10/2002 |
| TW | 525065 | 3/2003 |
| WO | WO 2004/038938 | 5/2004 |

OTHER PUBLICATIONS

International Search Report in corresponding International Appln. No. PCT/US2009/004483 dated Aug. 5, 2009, 4 pages.
English language translation of Taiwan Office Action with search report dated Nov. 22, 2012.

* cited by examiner

*Primary Examiner* — Marsha D Banks Harold
*Assistant Examiner* — Hooman Houshmand
(74) *Attorney, Agent, or Firm* — Buchanan Ingersoll & Rooney PC

(57) ABSTRACT

Methods include those by which nodes in a Frequency Hopping Spread Spectrum (FHSS) wireless network may be flexibly configured for beacon transmission and reception. The method may allow for any node to synchronize to any other node's given frequency to receive one or more beacon (broadcast) packets from that node at the designated period. The method may include sending, by a first node, a message to one or more neighbor nodes and responding, by the one or more neighbor nodes, with a message to the first node, the response message including a beacon frequency, a beacon transmit time and information about the current hopping sequence. The first node periodically programs its receiver to the beacon frequency at the beacon transmit time and uses the hopping sequence to receive information including at least one of routing information and timing updates for hopping channel synchronization from the one or more neighbor nodes.

10 Claims, 1 Drawing Sheet

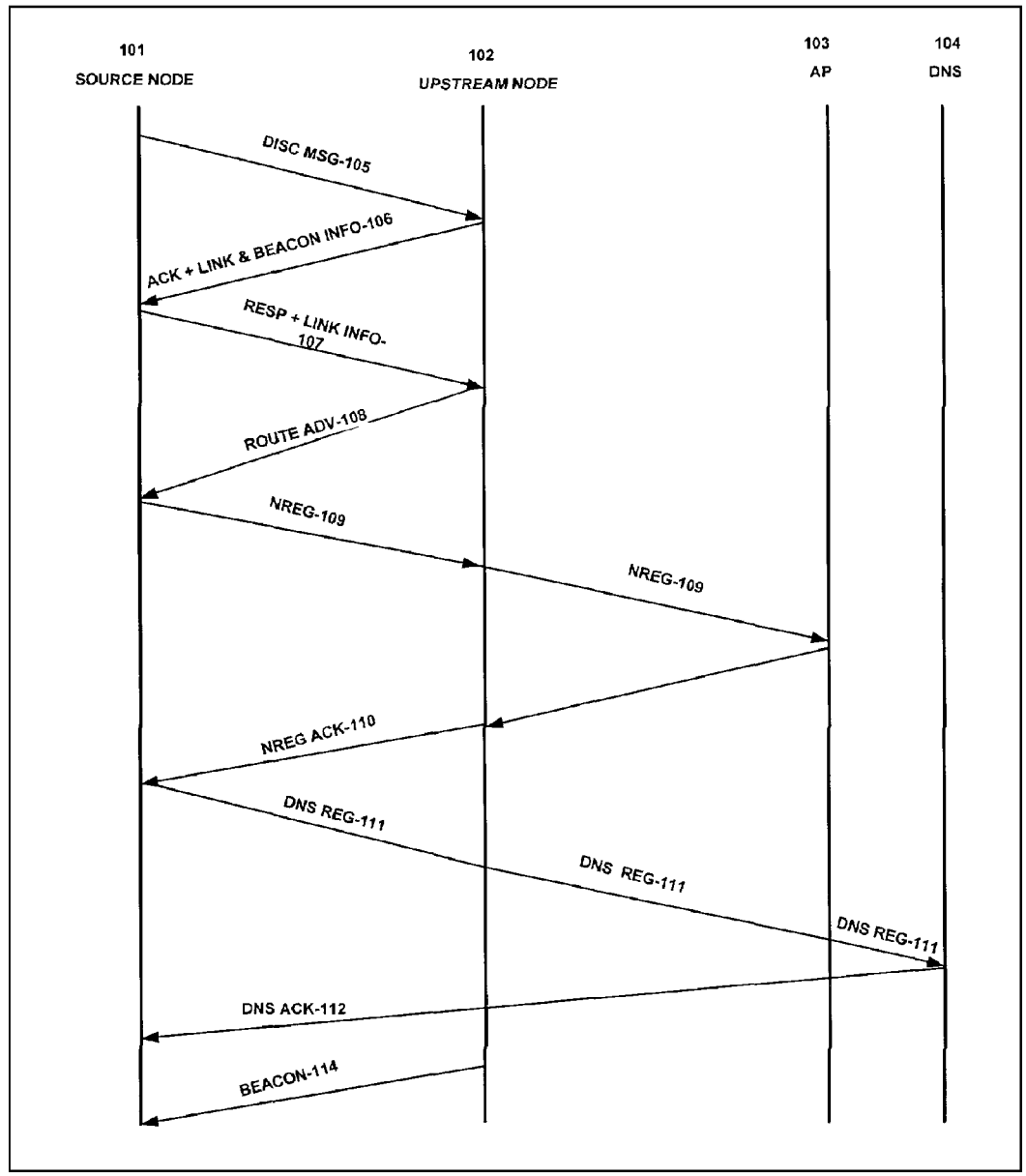
100

BEACONING TECHNIQUES IN FREQUENCY HOPPING SPREAD SPECTRUM (FHSS) WIRELESS MESH NETWORKS

BACKGROUND

1. Field

The subject matter presented herein relates generally to communications networks, and more particularly, to methods for locating nearby network nodes, disseminating timing information for node synchronization and advertising routing information in networks.

2. Description of Related Art

The term beaconing refers to the periodic transmission of "broadcast" frames on a pre-determined channel sequence. Broadcast in this sense means that these frames are sent to the broadcast destination address and not to a specific destination MAC address. These beacon frames may be used to convey timing and routing information and also serve as a form of "broadcast" in a wireless mesh network. Any node that knows the beacon channel sequence and timing may listen to the beacon transmission from a transmitting node. Known ad hoc wireless networks may employ "beacons" as a way in which network nodes may perform neighbor discovery (i.e., locate other nearby nodes) and advertise routing information. A beacon is a transmission that may be generated by one node and received by some or all of the nodes within a transmission range. All or fewer than all of the nodes in a network may be capable of beaconing.

SUMMARY

The subject matter presented herein relates to methods by which nodes in a Frequency Hopping Spread Spectrum (FHSS) network may be flexibly configured for beacon transmission and reception. The method may allow for any node to synchronize to any particular node's given frequency to receive a single beacon (broadcast) packet from that node at the designated period.

A method of communicating in a network comprises sending, by a first node, a message to one or more neighbor nodes; responding, by the one or more neighbor nodes, with a message to the first node, the response message comprising a beacon frequency, a beacon transmit time and information that enables a node to calculate the hopping sequence; and periodically programming the first node's receiver, by the first node, to tune to the beacon frequency at the beacon transmit time and using the hopping sequence to receive information comprising at least one of routing information and timing updates for hopping channel synchronization from the one or more neighbor nodes.

BRIEF DESCRIPTION OF THE DRAWINGS

As will be realized, different embodiments are possible, and the details herein are capable of modification in various respects, all without departing from the scope of the claims. Accordingly, the drawings and descriptions are to be regarded as illustrative in nature and not as restrictive.

FIG. 1 shows an exemplary embodiment for message exchange between nodes in a wireless network that may utilize beaconing.

DETAILED DESCRIPTION

In one embodiment, each transmit node may be set up to have a specific beaconing sequence and beaconing period. This beaconing sequence and period information may be communicated to the neighbor nodes during node discovery and registration message exchanges. It may not be part of the registration message but may be a concurrent message. Interested nodes may then selectively tune in to the beacon channel of any particular neighbor node using the received configuration information, and download any latest updates the beacon message may contain.

The exemplary methods may allow for a node in a FHSS wireless mesh network to receive timing updates from a neighbor node of its choice, and determine where the other node is in its hopping sequence (synchronization). The exemplary methods may also allow for a node to receive routing updates and routing advertisements from one or more preferred upstream neighbors. In a dense FHSS-based wireless mesh network, the beaconing mode may significantly improve traffic congestion, since one beacon transmission from a node may now replace more than one individual transmission from that node to each of its neighbors.

Beacon Configuration—Timing

In one embodiment, nodes that have beaconing capability may be set up with a configurable beacon transmit period. When a node powers up, it may choose a random time when it wants to start beaconing. This time may be randomized over the beacon transmit period and may be done to decrease the likelihood that nodes will send their beacon at the same time. Once the first beacon has been transmitted, each subsequent beacon may be transmitted at the configured beacon transmit period.

Beacon Configuration—Channel Sequence

In one embodiment, when a node powers on, not only may it choose the time at which it will send its first beacon, it also may choose its beacon channel sequence. According to the exemplary methods, the beacon channel sequence may be chosen in a pseudo-random fashion. The node may choose a random channel in its FHSS hopping sequence on which to transmit its first beacon. This channel number may then be used as the "seed" to calculate subsequent beacon transmission channels. In one embodiment, the beacon transmit seed may be equal to the starting channel unless the starting channel is 0, in which case the seed becomes 1 (as a seed of 0 is invalid). Each subsequent beacon transmit channel may be calculated by adding the seed to the previous beacon transmit channel. If this channel exceeds the total number of channels in the system, the number of channels in the system may be subtracted from the calculated channel to get a valid beacon transmit channel. The following exemplary pseudo-code illustrates this concept:

A) Beacon Transmit Channel = Previous Beacon Transmit Channel + Beacon Transmit Seed
B) If (Beacon Transmit Channel ≧ Number of System Channels), Then, Beacon Transmit Channel = Beacon Transmit Channel − Number of System Channels.

Beacon Configuration—Information Format

In one embodiment, each beacon may contain various pieces of information. When a beacon is formed, any code layer which desires to add information to the beacon may do so using a TLV (type-length-value). In one embodiment, once all code layers have provided their information, the MAC layer adds the MAC header to the frame and transmits the frame at the appropriate beaconing time. Examples of the type of information included in the beacon may be timing information and routing information. The timing information may be used to accurately target frames to a neighbor. Routing information may be sent in the beacon as it allows many nodes to send/receive routing update information and new routing advertisements without having to send a separate packet to each neighbor, thus greatly reducing the amount of routing traffic overhead in the network. An exemplary frame format of a beacon is given below:

| PHY HEADER (12) | Frame Control (1) | Source MAC (8) | Epoch Tick TLV (4) | Routing Info TLV (N) | Other TLVs (N) | CRC-32 (4) |
| --- | --- | --- | --- | --- | --- | --- |

Beacon Configuration—Conveying of Beacon Information

In one embodiment, in order for a node to listen to a neighbor's beacon, it receives beacon transmit time and channel information from the neighbor. This information may be conveyed by the MLME (MAC Layer Management Entity) during the link information exchange which occurs between neighbors during the neighbor discovery process. In one embodiment, the beacon configuration information conveyed during the link information exchange may include information and timing updates for hopping channel synchronization such as:

The beacon transmit seed
The beacon transmit rate (in seconds)
The channel on which the next beacon will be transmitted
The number of micro-seconds until the next beacon will be transmitted.

In one embodiment, the number of micro-seconds until the next beacon is transmitted may be synchronized to the receive time of the frame (at the receiver). With this information, a device may know the time and channel of subsequent beacons from a particular neighbor.

Beacon Configuration—Selective Reception

In one embodiment, on the receiving side, a node may have a list of neighbors that beacon. The node may decide when to listen to these beacons. Depending on the beaconing period and the type of information transmitted in the beacon, the node may decide not to receive all of a neighbor's beacons. In some embodiments, information that may be transmitted in a beacon may include timing updates for hopping channel synchronization. Timing updates may need to occur every fifteen minutes. In one embodiment, if the node beacons every five minutes, the receiving node may only need to listen to one out of every three beacons.

Additionally, in another embodiment, nodes may also receive routing information from neighbors via beacons. This routing information may only be critical from upstream neighbors (neighbors that are used by the receiving node for routing). Thus, routing information update beacons from downstream or lateral neighbors and non-preferred upstream neighbors may only be received if and when needed. Priority may be set for beacons from a select group of upstream neighbors.

Nodes may choose their beaconing transmit times randomly and independently. Thus, beacons initiated by two or more nodes may collide in time. A beacon receiver may choose which of these two beacons to listen to. In one embodiment, the exemplary methods enable the MAC layer to decide when to receive a beacon and which beacon to receive in case of a conflict. First, the application layer may assign a priority to the beacons from neighbors. In this case, the highest priority beacon may always be received. Further, the application layer may also assign a period at which it wants to receive beacons. If, for example, the application specifies that it wants to receive one beacon every twenty minutes, and beacons are sent every fifteen minutes, the beacon receiver may probably wait fifteen minutes before attempting to receive a beacon (it would not wait 20 minutes, just in case the beacon at that time was not received successfully). Based on the period specified, and the historical success rate of receiving beacons from a particular neighbor, the MAC layer may decide at which point to start listening for beacons to attempt to guarantee that it has a good probability of receiving at least one beacon. For example, if beacon reception rate is 50% and the application wants an 88% chance of receiving the beacon, the node needs to listen to three beacons before it has an 88% chance of receiving at least one of the beacons. At a 90% link, the node may listen twice. Further, multiple application layers may assign different priorities or periods to beacons from a particular neighbor. In this case, the MAC layer may adhere to a stricter requirement (minimum period and highest priority).

Example Embodiment

A beaconing concept in routing may be further illustrated in the example embodiment that is described in FIG. 1. A Utility Wireless Network 100 may consist of one or more Access Points (APs) 103 (also referred to as gateways) that connect a plurality of nodes 101/102 with a Back Office Server and a DNS server 104 via WAN. The nodes 101/102 may use one or more APs 103 for egress. The nodes 101 are typically referred to as "downstream nodes" as they use one or more upstream nodes for routing their packets to the AP 103 for egress. The upstream nodes 102 may normally provide a packet forwarding path for egress to one or more downstream nodes and constantly exchange routing information with the downstream nodes.

In this embodiment, when a new node 101 comes into operation (newly installed or after reboot following an outage or shut-down), it may exchange neighbor discovery messages 105 with one or more neighbors. Responding nodes may be typically upstream neighbors who have a route to the AP (for egress). The responding nodes 102 may send back ACK (Acknowledgement)/Link Information/Beacon Information 106 to the requesting node 101. The requesting node 101 may respond with a confirmation message along with its own link information via message 107. Node 102 may then send route advertisement message 108 to the source node 101 so that it may decide and configure a route for its packets. Then the source node 101 may initiate registration with AP 103 via NREG message 109. The AP 103 may then send a response with any added information via NREG ACK message 110 to the source node 101. This may then prompt the source node 101 to initiate DNS notification/registration with the DNS server 104 via DNS REG message 111, utilizing the advertised route provided by upstream node 102. The source node may then receive a DNS ACK message 112 from the DNS server 104 via the AP 103 and one of upstream nodes 102. The source node may accomplish its optimum route selection via one or more upstream nodes 102 for egress with one or more APs 103.

In this embodiment, the upstream node 102 follows its process of sending out beacon messages 114 at regularly scheduled intervals. The beacon message from the upstream node may be configured in a frame format at the MAC layer as a group of TLVs (type-length-value) assembled from information received from one or more upper layers that may include, e.g., routing updates and timing information. The source node 101 may choose to use the beacon set-up information it had received earlier from upstream node 102 via message 106, to program its receiver to the desired beacon frequency at the scheduled time, and use the requisite hopping sequence, to receive the routing updates. The source node 101 may choose to listen to beacons from one or more upstream nodes 102, and/or delete its choice of any of the upstream nodes for further beacon reception. The source node may be configured to process the TLVs and utilize only those of interest to it. For example, the source node may only process the timing update and routing update TLVs and ignore others.

The above description is presented to enable a person skilled in the art to make and use the systems and methods described herein, and it is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A method of communicating in a network, comprising:
    sending, by a first node, a message to two or more neighbor nodes;
    responding, by the two or more neighbor nodes, with a message to the first node, the response message including information comprising an indication of a beacon frequency, an indication of a beacon transmit time and information about a current hopping sequence;
    periodically tuning a receiver, by the first node, to the beacon frequency of one of the two or more neighbor nodes at an associated beacon transmit time based on respective response messages of the two or more neighbor nodes, wherein the first node assigns a priority to each of the two or more neighbor nodes and tunes to a beacon frequency of one of the two or more neighbor nodes based on the priority assigned to and unknown to each of the two or more neighbor nodes, and wherein the message of the beacon frequency not tuned to is not received by the first node; and
    using the information about the hopping sequence to receive information comprising routing information and timing updates from a beacon of the two or more neighbor nodes for hopping channel synchronization.

2. The method of claim 1, wherein the first node is a downstream node and the one or more neighbor nodes are upstream nodes.

3. The method of claim 1, comprising configuring the first node to listen to all or less than all of the beacons from each of the neighbor nodes and processing all or less than all of the information received from the neighbor nodes.

4. The method of claim 1, wherein the beacon frequency and beacon transmit time are configurable.

5. The method of claim 4, wherein a first scheduled beacon transmit time is randomly selected by the one or more neighbor nodes to start independently of a beacon receive period set by the receiver.

6. The method of claim 4, wherein the beacon frequency comprises an initial frequency and a sequence of frequencies for subsequent transmissions.

7. The method of claim 6, wherein the initial beacon frequency is randomly selected from among frequencies in a hopping sequence.

8. The method of claim 7, wherein a second beacon transmit channel number corresponding to a frequency for each subsequent transmission is calculated based on a first beacon transmit channel number corresponding to the randomly selected beacon frequency for an initial beacon transmission.

9. The method of claim 1, wherein the network is a frequency-hopping spread spectrum wireless mesh network.

10. The method of claim 1, wherein which beacon frequency of a neighbor node the first node tunes to is based on a time period assigned to the neighbor node by the first node.

* * * * *